United States Patent
Huang

(10) Patent No.: US 7,120,477 B2
(45) Date of Patent: Oct. 10, 2006

(54) PERSONAL MOBILE COMPUTING DEVICE HAVING ANTENNA MICROPHONE AND SPEECH DETECTION FOR IMPROVED SPEECH RECOGNITION

(75) Inventor: Xuedong D. Huang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 328 days.

(21) Appl. No.: 10/698,324

(22) Filed: Oct. 31, 2003

(65) Prior Publication Data

US 2004/0092297 A1    May 13, 2004

Related U.S. Application Data

(63) Continuation-in-part of application No. 09/447,192, filed on Nov. 22, 1999, now Pat. No. 6,675,027.

(51) Int. Cl.
*H04M 1/00* (2006.01)

(52) U.S. Cl. ............... 455/575.7; 455/575.1; 455/563; 704/231; 704/246

(58) Field of Classification Search ............ 455/575.7, 455/575.1, 563, 231, 246; 704/231, 246; 434/185, 157
See application file for complete search history.

(56) References Cited

U.S. PATENT DOCUMENTS

| | | | |
|---|---|---|---|
| 3,383,466 A | 5/1968 | Hilix et al. .................... 179/1 |
| 3,746,789 A | 7/1973 | Alcivar ........................ 179/1 |
| 3,787,641 A | 1/1974 | Santori ..................... 179/107 |
| 5,054,079 A | 10/1991 | Frielingsdorf et al. ...... 381/151 |
| 5,151,944 A | 9/1992 | Yamamura ................. 381/151 |
| 5,197,091 A | 3/1993 | Takagi et al. .......... 379/433.12 |
| 5,295,193 A | 3/1994 | Ono ........................... 381/151 |
| 5,404,577 A | 4/1995 | Zuckerman et al. .......... 455/66 |
| 5,446,789 A | 8/1995 | Loy et al. |
| 5,555,449 A | 9/1996 | Kim ...................... 379/433.03 |
| 5,647,834 A | 7/1997 | Ron ............................ 600/23 |
| 5,692,059 A | 11/1997 | Kruger ...................... 381/151 |
| 5,757,934 A | 5/1998 | Yokoi ........................ 381/68.3 |
| 5,828,768 A | 10/1998 | Eatwell et al. .............. 381/333 |
| 5,873,728 A * | 2/1999 | Jeong ......................... 434/185 |
| 5,933,506 A | 8/1999 | Aoki et al. ................. 381/151 |
| 5,943,627 A | 8/1999 | Kim et al. .................. 379/426 |
| 5,983,073 A | 11/1999 | Ditzik ....................... 455/11.1 |

(Continued)

FOREIGN PATENT DOCUMENTS

DE    19917169 A1    11/2000

(Continued)

OTHER PUBLICATIONS

U.S. Appl. No. 10/629,278, filed Jul. 29, 2003, entitled "Multi-Sensory Speech Detection System".

(Continued)

*Primary Examiner*—Danh Cong Le
(74) *Attorney, Agent, or Firm*—John D. Veldhuis-Kroeze; Westman, Champlin & Kelly, P.A.

(57) ABSTRACT

A mobile computing device, adapted to be held in the palm of a user's hand, includes an antenna for transmission of information from the mobile computing device. A first microphone, adapted to convert audible speech from the user into speech signals, is positioned at a distal end of the antenna. The antenna is rotatable, while the mobile computing device is held by the user, into a position which directs the first microphone toward the mouth of the user. A speech sensor outputs a sensor signal indicative of whether the user is speaking.

13 Claims, 17 Drawing Sheets

U.S. PATENT DOCUMENTS

| | | | |
|---|---|---|---|
| 6,028,556 A * | 2/2000 | Shiraki | 343/702 |
| 6,052,464 A | 4/2000 | Harris et al. | 379/433 |
| 6,052,567 A * | 4/2000 | Ito et al. | 455/575.7 |
| 6,091,972 A * | 7/2000 | Ogasawara | 455/575.7 |
| 6,094,492 A | 7/2000 | Boesen | 381/312 |
| 6,125,284 A | 9/2000 | Moore et al. | 455/557 |
| 6,137,883 A | 10/2000 | Kaschke et al. | 379/433.07 |
| 6,175,633 B1 | 1/2001 | Morrill et al. | 381/71.6 |
| 6,243,596 B1 | 6/2001 | Kikinis | 429/8 |
| 6,308,062 B1 | 10/2001 | Chien et al. | 455/420 |
| 6,339,706 B1 | 1/2002 | Tillgren et al. | 455/419 |
| 6,343,269 B1 | 1/2002 | Harada et al. | 704/213 |
| 6,408,081 B1 | 6/2002 | Boesen | 381/312 |
| 6,411,933 B1 * | 6/2002 | Maes et al. | 704/273 |
| 6,542,721 B1 | 4/2003 | Boesen | 455/90 |
| 6,560,468 B1 | 5/2003 | Boesen | 455/568 |
| 6,594,629 B1 | 7/2003 | Basu et al. | 704/270 |
| 6,664,713 B1 | 12/2003 | Boesen | 310/328 |
| 6,675,027 B1 | 1/2004 | Huang | 455/575 |
| 6,760,600 B1 | 7/2004 | Nickum | 455/557 |
| 2001/0027121 A1 | 10/2001 | Boesen | |
| 2001/0039195 A1 * | 11/2001 | Nickum | 455/557 |
| 2002/0057810 A1 | 5/2002 | Boesen | |
| 2002/0075306 A1 | 6/2002 | Thompson et al. | |
| 2002/0181669 A1 | 12/2002 | Takatori et al. | |
| 2002/0196955 A1 | 12/2002 | Boesen et al. | |
| 2002/0198021 A1 | 12/2002 | Boesen | 455/556 |
| 2003/0083112 A1 | 5/2003 | Fukuda | 455/568 |
| 2003/0125081 A1 | 7/2003 | Boesen | 455/556 |
| 2003/0144844 A1 | 7/2003 | Colmenarez et al. | 704/273 |
| 2004/0092297 A1 | 5/2004 | Huang | |
| 2006/0008256 A1 | 1/2006 | Khedouri et al. | |
| 2006/0009156 A1 | 1/2006 | Hayes et al. | |
| 2006/0072767 A1 | 4/2006 | Zhang et al. | |
| 2006/0079291 A1 | 4/2006 | Granovetter et al. | |

FOREIGN PATENT DOCUMENTS

| | | |
|---|---|---|
| EP | 0133650 B1 | 10/1987 |
| EP | 0 720 338 A2 | 7/1996 |
| EP | 0 854 535 A2 | 7/1998 |
| EP | 0 939 534 A1 | 9/1999 |
| EP | 0 951 883 | 10/1999 |
| EP | 1569422 A2 | 8/2005 |
| FR | 2 761 800 | 4/1997 |
| GB | 2 375 276 A | 11/2002 |
| GB | 2 390 264 A | 12/2003 |
| JP | 3108997 A2 | 5/1991 |
| JP | 5276587 A2 | 10/1993 |
| JP | 8065781 A2 | 3/1996 |
| JP | 8070344 A2 | 3/1996 |
| JP | 8079868 A2 | 3/1996 |
| JP | 10023122 A2 | 1/1998 |
| JP | 10023123 A2 | 1/1998 |
| JP | 11265199 A2 | 9/1999 |
| JP | 2000196723 | 7/2000 |
| JP | 2000209688 A2 | 7/2000 |
| JP | 2000261529 A2 | 9/2000 |
| JP | 2000261530 A2 | 9/2000 |
| JP | 2000261534 A2 | 9/2000 |
| JP | 2000354284 A2 | 12/2000 |
| JP | 2001119797 | 4/2001 |
| JP | 2001245397 | 9/2001 |
| JP | 2001292489 | 10/2001 |
| JP | 2002125298 A2 | 4/2002 |
| JP | 2002358089 A2 | 12/2002 |
| WO | WO 93/01664 | 1/1993 |
| WO | WO 95/17746 | 6/1995 |
| WO | WO 99/04500 | 1/1999 |
| WO | WO 00/21194 | 10/1999 |
| WO | WO 00/45248 | 8/2000 |
| WO | WO 02/077972 A1 | 10/2002 |
| WO | 02098169 A1 | 12/2002 |
| WO | WO 03/055270 A1 | 7/2003 |

OTHER PUBLICATIONS

U.S. Appl. No. 10/636,176, filed Aug. 7, 2003, entitled "Head Mounted Multi-Sensory Audio Input System".

U.S. Appl. No. 10/724,008, filed Nov. 26, 2003, entitled "Method and Apparatus for Multi-Sensory Speech Enhancement".

U.S. Appl. No. 10/785,768, filed Feb. 24, 2004, entitled "Method and Apparatus for Multi-Sensory Speech Enhancement on a Mobile Device".

Search Report dated Dec. 17, 2004. from International Application No. 04016226.5.

Zheng et al., Y., "Air- and Bone-Conductive Integrated Microphones for Robust Speech Detection and Enhancement", Automatice Speech Recognition and Understanding 2003, pp. 249-254.

De Cuetos et al., P., "Audio-visual intent-to-speak detection for human-computer interaction", IEEE International Conference on Acoustics, Speech, and Signal Processing '00, vol. 6, pp. 2373-2376, Jun. 5, 2000.

http://www.snaptrack.com/ (2004).

http://www.misumi.com.tw/PLIST.ASP?PC.ID:21 (2004).

http://www.wherifywireless.com/univLoc.asp (2001).

http://www.wherifywireless.com/prod.watches.htm (2001).

Microsoft Office, Live Communications Server 2003, Microsoft Corporation, pp. 1-10.

Shoshana Berger, http://www.cnn.com/technology, "Wireless, wearable, and wondrous tech," Jan. 17, 2003.

http://www.3G.co.uk, "NTT DoCoMo to Introduce First Wireless GPS Handset," Mar. 27, 2003.

"Physiological Monitoring System 'Lifeguard' System Specifications," Stanford University Medical Center, National Biocomputation Center, Nov. 8, 2002.

Nagl, L., "Wearable Sensor System for Wireless State-of-Health Determination in Cattle," Annual International Conference of the Institute of Electrical and Electronics Engineers' Engineering in Medicine and Biology Society, 2003.

Asada, H. and Barbagelata, M., "Wireless Fingernail Sensor for Continuous Long Term Health Monitoring," MIT Home Automation and Healthcare Consortium, Phase 3, Progress Report No. 3-1, Apr. 2001.

Kumar, V., "The Design and Testing of a Personal Health System to Motivate Adherence to Intensive Diabetes Management," Harvard-MIT Division of Health Sciences and Technology, pp. 1-66, 2004.

Copy of European Search Report from Appln. No. 05107921.8, filed Aug. 30, 2005.

M. Graciarena, H. Franco, K. Sonmez, and H. Bratt, "Combining Standard and Throat Microphones for Robust Speech Recognition," IEEE Signal Processing Letters, vol. 10, No. 3, pp. 72-74, Mar. 2003.

P. Heracleous, Y. Nakajima, A. Lee, H. Saruwatari, K. Shikano, "Accurate Hidden Markov Models for Non-Audible Murmur (NAM) Recognition Based on Iterative Supervised Adaptation," ASRU 2003, St. Thomas, U.S. Virgin Islands, Nov. 20-Dec. 4, 2003.

O.M. Strand, T. Holter, A. Egeberg, and S. Stensby, "On the Feasibility of ASR in Extreme Noise Using the PARAT Earplug Communication Terminal," ASRU 2003, St. Thomas, U.S. Virgin Islands, Nov.20-Dec.4, 2003.

Zhang et al., "Multi-Sensory Microphones For Robust Speech Detection, Enchantment, and Recognition," ICASSP 04, Montreal, May 2004.

Bakar, "The Insight of Wireless Communication," Research and Development, Student Conference on Jul. 2002.

European Search Report from Application No. 05108871.4, filed Sep. 26, 2005.

U.S. Appl. No. 11/156,434, filed Jun. 20, 2005, entitled "Multi-Sensory Speech Enhancement Using a Clean Speech Prior".

* cited by examiner

PERSONAL MOBILE COMPUTING DEVICE HAVING ANTENNA MICROPHONE AND SPEECH DETECTION FOR IMPROVED SPEECH RECOGNITION

The present application is a continuation-in-part of and claims priority of U.S. patent application Ser. No. 09/447,192, filed Nov. 22, 1999 now U.S. Pat. No. 6,675,027, the content of which is hereby incorporated by reference in its entirety.

CROSS-REFERENCE TO RELATED APPLICATIONS

Reference is made to co-pending and commonly assigned U.S. patent application Ser. No. 10/636,176, filed Aug. 7, 2003 and U.S. patent application Ser. No. 10/629,278, filed Jul. 29, 2003, the contents of which are hereby incorporated by reference in their entirety.

BACKGROUND OF THE INVENTION

The present invention relates to personal mobile computing devices. More particularly, the present invention relates to an apparatus, system and method for enhancing speech recognition in mobile computing devices.

Mobile devices are small electronic computing devices sometimes referred to as personal digital assistants (PDAs). Many of such mobile devices are handheld devices, or palm-size devices, which comfortably fit within the hand. One commercially available mobile device is sold under the trade name HandHeld PC (or H/PC) having software provided by Microsoft Corporation of Redmond, Wash.

Generally, the mobile device includes a processor, random access memory (RAM), and an input device such as a keyboard and a display, wherein the keyboard can be integrated with the display, such as a touch sensitive display. A communication interface is optionally provided and is commonly used to communicate with a desktop computer. A replaceable or rechargeable battery powers the mobile device. Optionally, the mobile device can receive power from an external power source that overrides or recharges the built-in battery, such as a suitable AC or DC adapter, or a powered docking cradle.

In one common application, the mobile device is used in conjunction with the desktop computer. For example, the user of the mobile device may also have access to, and use, a desktop computer at work or at home. The user typically runs the same types of applications on both the desktop computer and on the mobile device. Thus, it is quite advantageous for the mobile device to be designed to be coupled to the desktop computer to exchange information with, and share information with, the mobile device.

As the mobile computing device market continues to grow, new developments can be expected. For example, mobile devices can be integrated with cellular or digital wireless communication technology to provide a mobile computing device which also functions as a mobile telephone. Thus, cellular or digital wireless communication technology can provide the communication link between the mobile device and the desktop (or other) computer. Further, speech recognition can be used to record data or to control functions of one or both of the mobile computing device and the desktop computer, with the user speaking into a microphone on the mobile device and with signals being transmitted to the desktop computer based upon the speech detected by the microphone.

Several problems arise when attempting to perform speech recognition, at the desktop computer, of words spoken into a remote microphone such as a microphone positioned on a mobile device. First, the signal-to-noise ratio of the speech signals provided by the microphone drops as the distance between the microphone and the user's mouth increases. With a typical mobile device being held in a user's palm up to a foot from the user's mouth, the resulting signal-to-noise ratio drop may be a significant speech recognition obstacle. Also, internal noise within the mobile device lowers the signal-to-noise ratio of the speech signals due to the close proximity of the internal noise to the microphone which is typically positioned on a housing of the mobile device. Second, due to bandwidth limitations of digital and other wireless communication networks, the speech signals received at the desktop computer will be of lower quality, as compared to speech signals from a desktop microphone. Thus, with different desktop and telephony bandwidths, speech recognition results will vary when using a mobile computing device microphone instead of a desktop microphone.

The aforementioned problems are not limited to speech recognition performed at a desktop computer. In many different speech recognition applications, it is very important, and can be critical, to have a clear and consistent audio input representing the speech to be recognized provided to the automatic speech recognition system. Two categories of noise which tend to corrupt the audio input to the speech recognition system are ambient noise and noise generated from background speech. There has been extensive work done in developing noise cancellation techniques in order to cancel ambient noise from the audio input. Some techniques are already commercially available in audio processing software, or integrated in digital microphones, such as universal serial bus (USB) microphones.

Dealing with noise related to background speech has been more problematic. This can arise in a variety of different, noisy environments. For example, where the speaker of interest is talking in a crowd, or among other people, a conventional microphone often picks up the speech of speakers other than the speaker of interest. Basically, in any environment in which other persons are talking, the audio signal generated from the speaker of interest can be compromised.

One prior solution for dealing with background speech is to provide an on/off switch on the cord of a headset or on a handset. The on/off switch has been referred to as a "push-to-talk" button and the user is required to push the button prior to speaking. When the user pushes the button, it generates a button signal. The button signal indicates to the speech recognition system that the speaker of interest is speaking, or is about to speak. However, some usability studies have shown that this type of system is not satisfactory or desired by users. Thus, incorporating this type of feature in a mobile device may produce unsatisfactory results.

In addition, there has been work done in attempting to separate background speakers picked up by microphones from the speaker of interest (or foreground speaker). This has worked reasonably well in clean office environments, but has proven insufficient in highly noisy environments.

In yet another prior technique, a signal from a standard microphone has been combined with a signal from a throat microphone. The throat microphone registers laryngeal behavior indirectly by measuring the change in electrical impedance across the throat during speaking. The signal generated by the throat microphone was combined with the conventional microphone and models were generated that modeled the spectral content of the combined signals.

An algorithm was used to map the noisy, combined standard and throat microphone signal features to a clean standard microphone feature. This was estimated using probabilistic optimum filtering. However, while the throat microphone is quite immune to background noise, the spectral content of the throat microphone signal is quite limited. Therefore, using it to map to a clean estimated feature vector was not highly accurate. This technique is described in greater detail in Frankco et al., *COMBINING HETEROGENEOUS SENSORS WITH STANDARD MICROPHONES FOR NOISY ROBUST RECOGNITION,* Presentation at the DARPA ROAR Workshop, Orlando, Fla. (2001). In addition, wearing a throat microphone is an added inconvenience to the user.

SUMMARY OF THE INVENTION

A mobile computing apparatus includes an antenna for transmission of information from the mobile computing apparatus. A first microphone, adapted to convert audible speech from the user into speech signals, is positioned at a distal end of the antenna. The antenna is rotatable into a position which directs the first microphone toward the mouth of the user. A speech sensor outputs a sensor signal which is indicative of whether the user is speaking, thus allowing the affects of background noise and speakers to be reduced.

In some embodiments of the invention, the antenna is rotatable to a position that, for a particular viewing angle and separation distance of the mobile apparatus relative to the user, minimizes the distance between the first microphone and the mouth of the user. Minimizing this distance increases the signal to noise ratio of the speech signals provided by the first microphone.

In some embodiments, the speech sensor outputs the sensor signal based on a non-audio input generated by speech actions of the user, such as movement of the user's mouth. The speech sensor can be positioned on the antenna, or elsewhere on the mobile computing device. A speech detector component outputs a speech detection signal indicative of whether the user is speaking based on the sensor signal.

The mobile computing device can be a cellular or digital wireless telephone. The mobile computing device can also be adapted to implement speech recognition processing of the speech signals.

DETAILED DESCRIPTION OF ILLUSTRATIVE EMBODIMENTS

Figure 1:
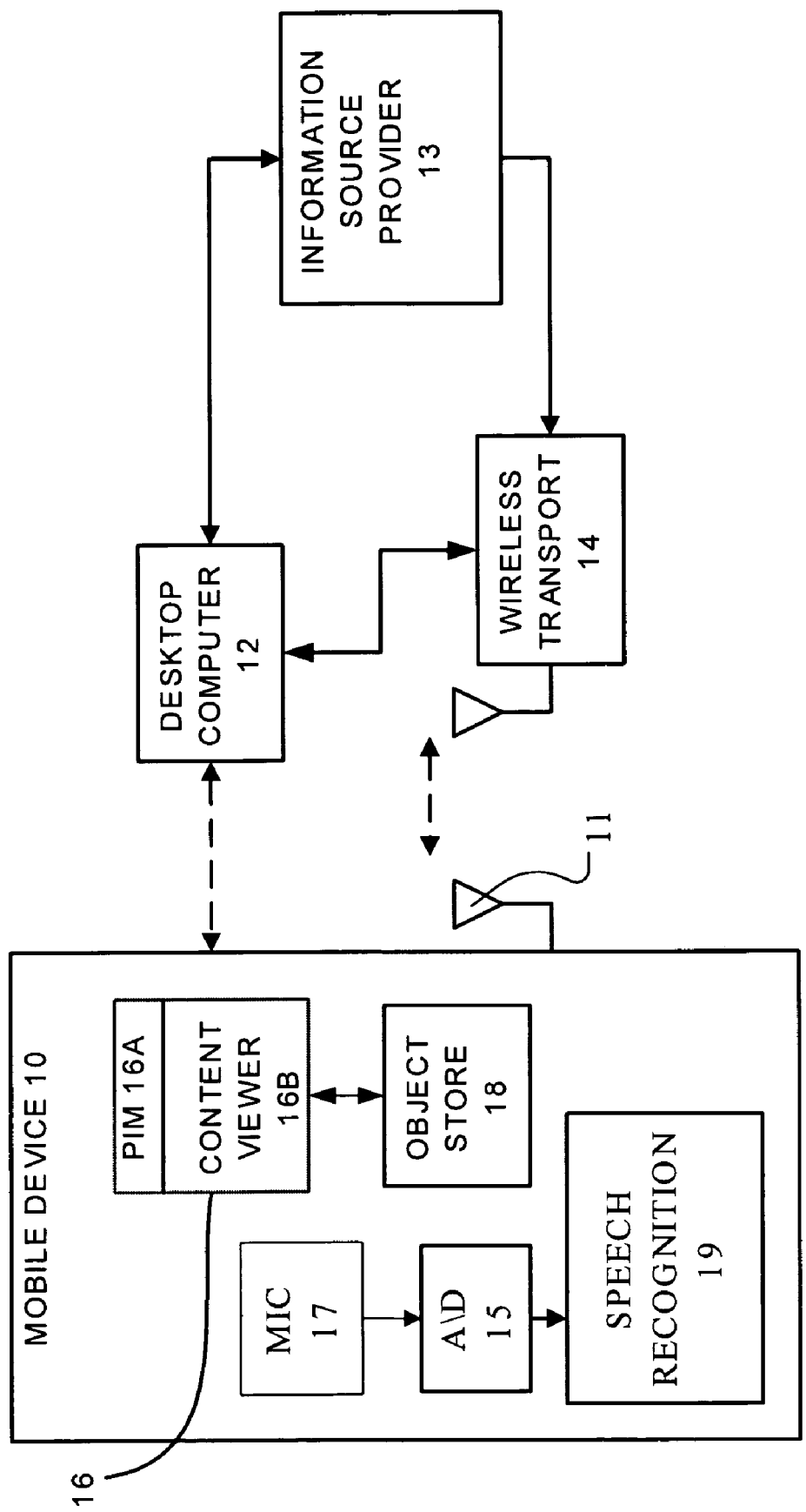
FIG. 1 is a simplified block diagram illustrating one embodiment of a mobile device in accordance with the present invention.

FIG. 1 is a block diagram of an exemplary portable computing device, herein a mobile device 10 in accordance with the present invention. FIG. 1 illustrates that, in one embodiment, the mobile device 10 is suitable for connection with, and to receive information from, a desktop computer 12, a wireless transport 14, or both. The wireless transport 14 can be a paging network, cellular digital packet data (CDPD), FM-sideband, or other suitable wireless communications. However, it should also be noted that the mobile device 10 may not be equipped to be connected to the desktop computer 12, and the present invention applies regardless of whether the mobile device 10 is provided with this capability. Mobile device 10 can be a personal digital assistant (PDA) or a hand held portable computer having cellular or digital wireless phone capabilities and adapted to perform both conventional PDA functions and to serve as a wireless telephone.

In an exemplary embodiment, mobile device 10 includes a microphone 17, an analog-to-digital (A/D) converter 15 and speech recognition programs 19. In response to verbal commands, instructions or information from a user of device 10, microphone 17 provides speech signals which are digitized by A/D converter 15. Speech recognition programs 19 perform feature extraction functions on the digitized speech signals to obtain intermediate speech recognition results. Using antenna 11, device 10 transmit the intermediate speech recognition results over wireless transport 14 to desktop computer 12 where additional speech recognition programs are used to complete the speech recognition process.

In other embodiments of the invention, intermediate speech recognition results are not transmitted to desktop computer 12, but instead programs 19 complete the speech recognition functions in mobile device 10. In yet other embodiments of the invention, mobile device 10 does not include speech recognition programs, and instead transmits the speech signals from microphone 17 over wireless transport 14 to desktop computer 12 or elsewhere. For example, in embodiments in which mobile device 10 functions as a mobile telephone, mobile device 10 can transmit the speech signals to other telephones.

In some embodiments, mobile device 10 includes one or more other application programs 16 and an object store 18. The application programs 16 can be, for example, a personal information manager (PIM) 16A that stores objects related to a user's electronic mail (e-mail) and scheduling or calendaring information. The application programs 16 can also include a content viewer 16B that is used to view information obtained from a wide-area network, such as the Internet. In one embodiment, the content viewer 16B is an "offline" viewer in that information is stored primarily before viewing, wherein the user does not interact with the source of information in real time. In other embodiments, mobile device 10 operates in a real time environment wherein the wireless transport 14 provides two-way communication. PIM 16A, content viewer 16B and object store 18 are not required in all embodiments of the invention.

In embodiments including PIM 16A, content viewer 16B and object store 18, the wireless transport 14 can also be used to send information to the mobile device 10 for storage in the object store 18 and for use by the application programs 16. The wireless transport 14 receives the information to be sent from an information source provider 13, which, for example, can be a source of news, weather, sports, traffic or local event information. Likewise, the information source provider 13 can receive e-mail and/or scheduling information from the desktop computer 12 to be transmitted to the mobile device 10 through the wireless transport 14. The information from the desktop computer 12 can be supplied to the information source provider 13 through any suitable communication link, such as a direct modem connection. In another embodiment, the desktop computer 12 and the information source provider 13 can be connected together forming a local area network (LAN) or a wide area network (WAN). Such networking environments are commonplace in offices, enterprise-wide computer network Intranets and the Internet. If desired, the desktop computer 12 can also be directly connected to the wireless transport 14.

It is also worth noting that, in one embodiment, the mobile device 10 can be coupled to the desktop computer 12 using any suitable, and commercially available, communication link and using a suitable communications protocol. For instance, in one embodiment, the mobile device 10 communicates with the desktop computer 12 with a physical cable which communicates using a serial communications protocol. Other communication mechanisms include infra-red (IR) communication and direct modem communication.

It is also worth noting that the mobile device 10, in one embodiment, can be synchronized with the desktop computer 12. In that instance, properties of objects stored in object store 18 are similar to properties of other instances of the same objects stored in an object store on the desktop computer 12 or on the mobile device 14. Thus, for example, when one instance of an object stored in the object store on the desktop computer 12, the second instance of that object in the object store 18 of the mobile device 10 is updated the next time the mobile device 10 is connected to the desktop computer 12 so that both instances of the same object contain up-to-date data. This is commonly referred to as synchronization. In order to accomplish synchronization, synchronization components run on both the mobile device 10 and the desktop computer 12. The synchronization components communicate with one another through well defined interfaces to manage communication and synchronization.

Figure 2:
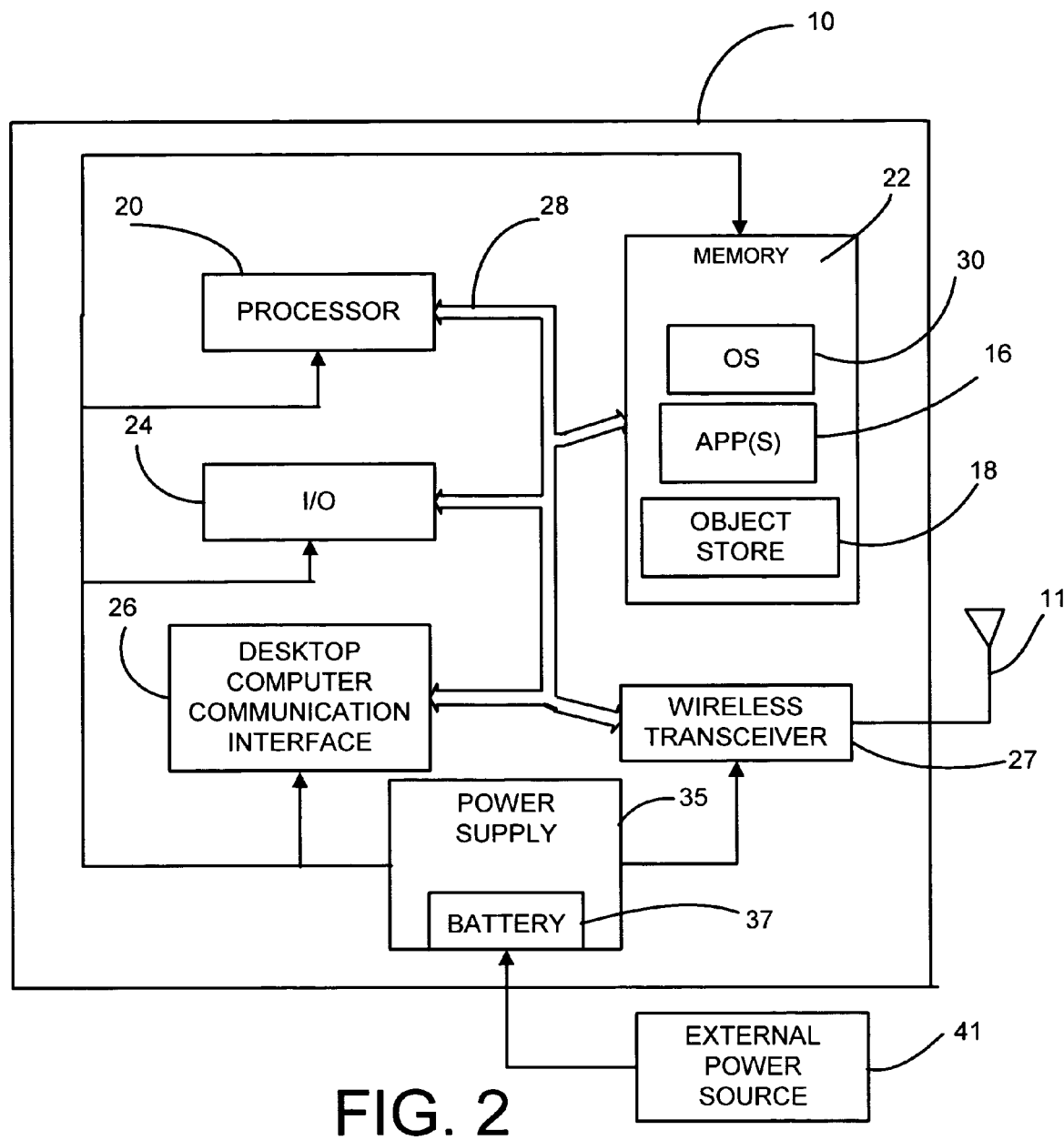
FIG. 2 is a more detailed block diagram of one embodiment of the mobile device shown in FIG. 1.

FIG. 2 is a more detailed block diagram of the mobile device 10. As shown, the mobile device 10 includes a processor 20, memory 22, input/output (I/O) components 24, a desktop computer communication interface 26, wireless transceiver 27 and antenna 11. In one embodiment, these components of the mobile device 10 are coupled for communication with one another over a suitable bus 28. Mobile device 10 includes microphone 17 as illustrated in FIG. 1 and discussed below with reference to FIGS. 3–7. Microphone 17 is, in one embodiment, coupled to processor 20 via A/D converter 15, I/O component 24, and bus 28.

Memory 22 is implemented as non-volatile electronic memory such as random access memory (RAM) with a battery back-up module (not shown) such that information stored in memory 22 is not lost when the general power to the mobile device 10 is shut down. A portion of memory 22 is allocated as addressable memory for program execution, while the remaining portion of memory 22 can be used for storage, such as to simulate storage on a disk drive.

Memory 22 includes an operating system 30, the application programs 16 (such as PIM 16A and speech recognition programs 19 discussed with respect to FIG. 1) and the object store 18. During operation, the operating system 30 is loaded into, and executed by, the processor 20 from memory 22. The operating system 30, in one embodiment, is a Windows CE brand operating system commercially available from Microsoft Corporation. The operating system 30 can be designed for mobile devices, and implements features which can be utilized by PIM 16A, content viewer 16B and speech recognition functions 19 through a set of exposed application programming interfaces and methods. The objects in object store 18 are maintained by PIM 16A, content viewer 16B and the operating system 30, at least partially in response to calls to the exposed application programming interfaces and methods.

The I/O components 24, in one embodiment, are provided to facilitate input and output operations from the user of the mobile device 10. The desktop computer communication interface 26 is optionally provided as any suitable, and commercially available, communication interface. The interface 26 is used to communicate with the desktop computer 12 when wireless transceiver 27 is not used for that purpose.

The wireless transceiver 27 transmits speech signals or intermediate speech recognition results over wireless transport 14 using antenna 11. Wireless transceiver 27 can also transmit other data over wireless transport 14. In some embodiments, transceiver 27 receives information from desktop computer 12, the information source provider 13, or from other mobile or non-mobile devices or phones. The wireless transceiver 27 is coupled to the bus 28 for communication with the processor 20 and the object store 18 to store information received from the wireless transport 14.

A power supply 35 includes a battery 37 for powering the mobile device 10. Optionally, the mobile device 10 can receive power from an external power source 41 that overrides or recharges the built-in battery 37. For instance, the external power source 41 can include a suitable AC or DC adapter, or a power docking cradle for the mobile device 10.

Figure 3:
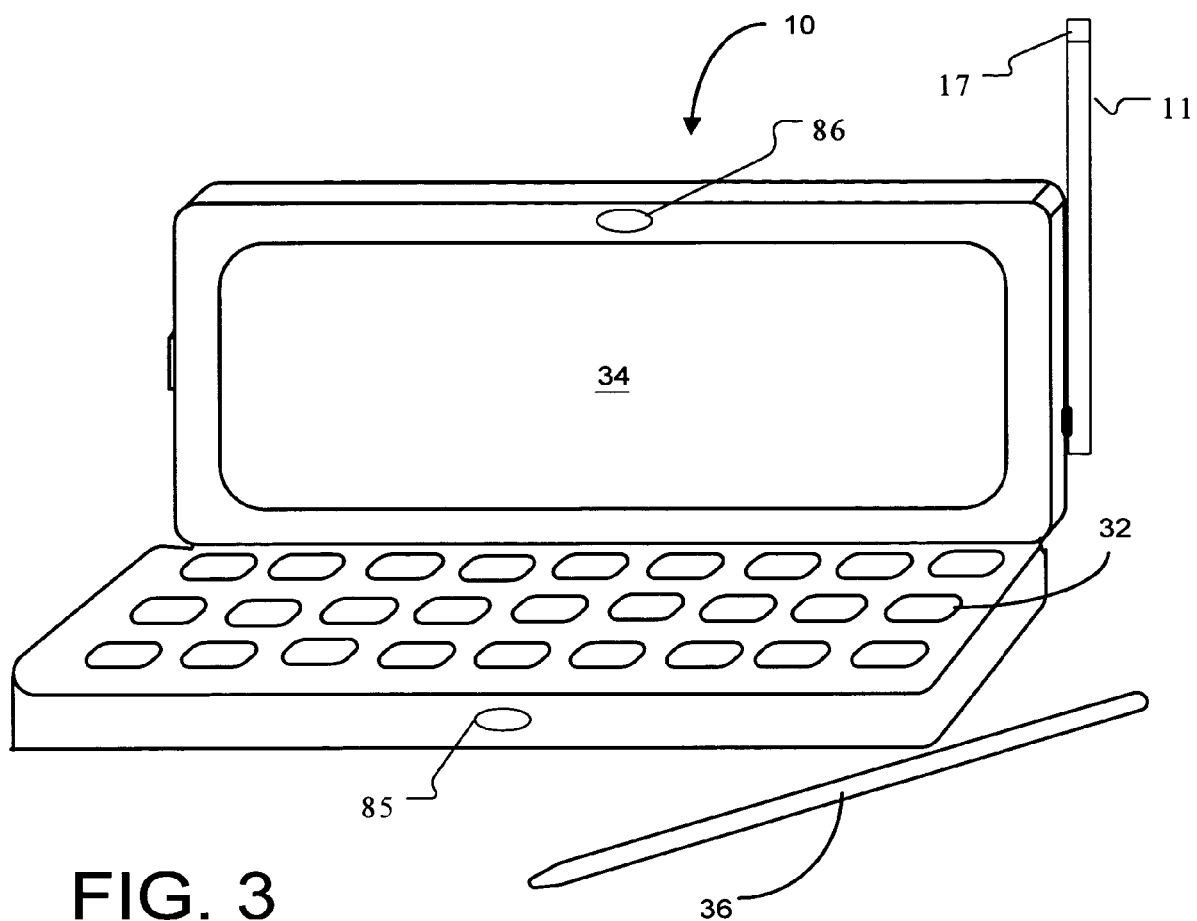
FIG. 3 is a simplified pictorial illustration of one embodiment of the mobile device in accordance with the present invention.

FIG. 3 is a simplified pictorial illustration of one embodiment of the mobile device 10 which can be used in accordance with the present invention. In this embodiment, in addition to antenna 11 and microphone 17, mobile device 10 includes a miniaturized keyboard 32, a display 34, a stylus 36, a second microphone 85 and a speaker 86. In the embodiment shown in FIG. 3, the display 34 is a liquid crystal display (LCD) which uses a contact sensitive display screen in conjunction with the stylus 36. The stylus 36 is used to press or contact the display 34 at designated coordinates to accomplish certain user input functions. The miniaturized keyboard 32 is implemented as a miniaturized alpha-numeric keyboard, with any suitable and desired function keys which are also provided for accomplishing certain user input functions.

Microphone 17 is positioned on a distal end of antenna 11. Antenna 11 is in turn adapted to rotate toward the mouth of the user, thereby reducing the distance between the mouth of the user and microphone 17 while mobile device 10 is held in the palm of the user's hand. As noted above, reducing this distance helps to increase the signal-to-noise ratio of the speech signals provided by the microphone. Further, placement of microphone 17 at the tip of antenna 11 moves the microphone from the housing of mobile device 10. This reduces the effects of internal device noise on the signal-to-noise ratio.

In some embodiments, mobile device 10 also includes second microphone 85, which can be positioned on the housing of mobile device 10. Providing a second microphone 85 which is distanced from first microphone 17 enhances performance of the resulting microphone array when the two microphones are used together. In some embodiments, speaker 86 is included to allow mobile device 10 to be used as a mobile telephone.

Figure 4:
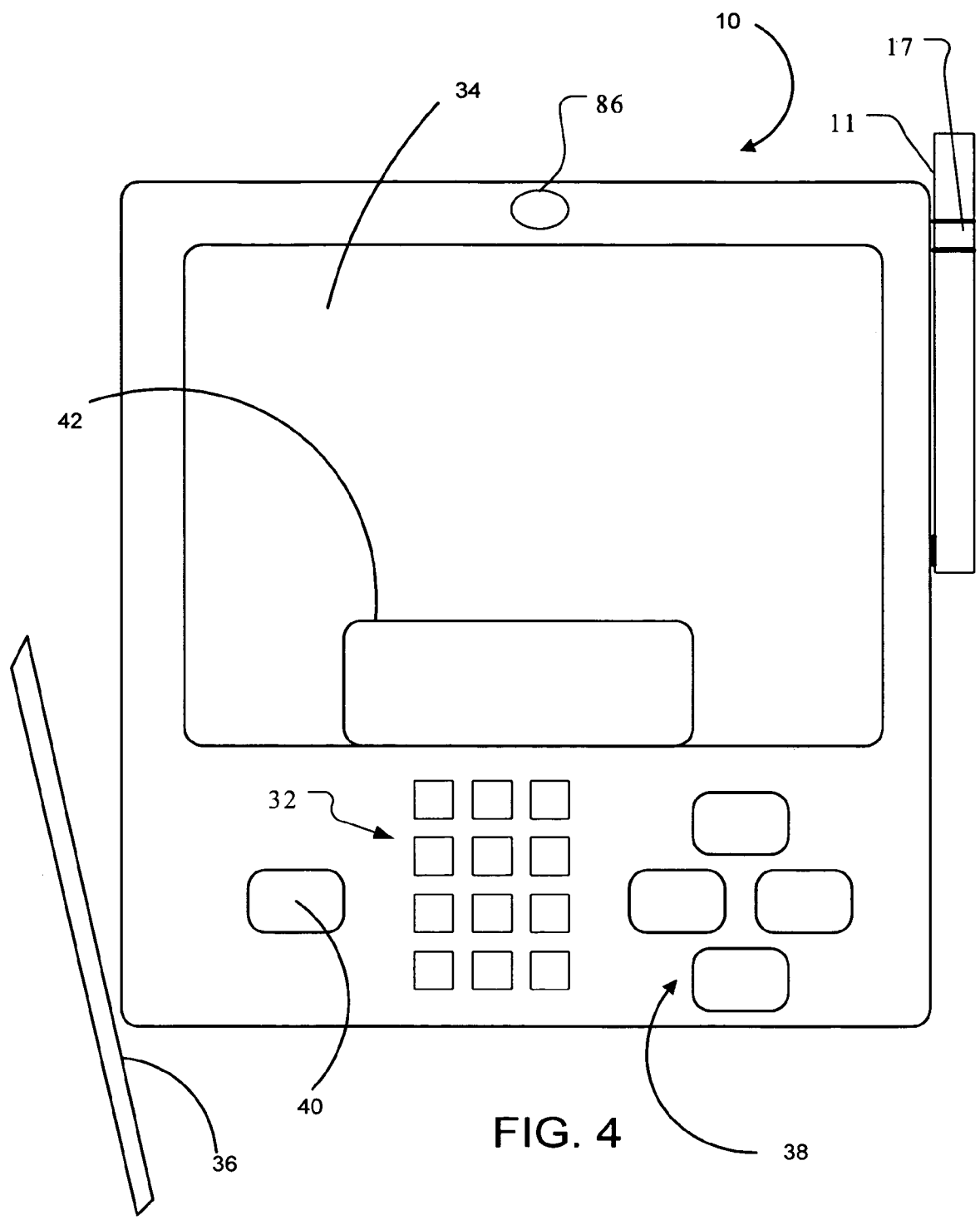
FIG. 4 is a simplified pictorial illustration of another embodiment of the mobile device in accordance with the present invention.

FIG. 4 is another simplified pictorial illustration of the mobile device 10 in accordance with another embodiment of the present invention. The mobile device 10, as illustrated in FIG. 4, includes some items which are similar to those described with respect to FIG. 3, and are similarly numbered. For instance, the mobile device 10, as shown in FIG. 4, also includes microphone 17 positioned on antenna 11 and speaker 86 positioned on the housing of the device. As shown in FIG. 4, microphone 17 need not be positioned at the distal end of antenna 11 in all embodiments. Positioning microphone 17 at other positions on antenna 11 provides many of the same benefits as does positioning the microphone at the distal end of the antenna.

Mobile device 10 also includes touch sensitive display 34 which can be used, in conjunction with the stylus 36, to accomplish certain user input functions. It should be noted that the display 34 for the mobile devices shown in FIGS. 3 and 4 can be the same size, or of different sizes, but will typically be much smaller than a conventional display used with a desktop computer. For example, the displays 34 shown in FIGS. 3 and 4 may be defined by a matrix of only 240×320 coordinates, or 160×160 coordinates, or any other suitable size.

The mobile device 10 shown in FIG. 4 also includes a number of user input keys or buttons (such as scroll buttons 38 and/or keyboard 32) which allow the user to enter data or to scroll through menu options or other display options which are displayed on display 34, without contacting the display 34. In addition, the mobile device 10 shown in FIG. 4 also includes a power button 40 which can be used to turn on and off the general power to the mobile device 10.

It should also be noted that in the embodiment illustrated in FIG. 4, the mobile device 10 includes a hand writing area 42. Hand writing area 42 can be used in conjunction with the stylus 36 such that the user can write messages which are stored in memory 22 for later use by the mobile device 10. In one embodiment, the hand written messages are simply stored in hand written form and can be recalled by the user and displayed on the display 34 such that the user can review the hand written messages entered into the mobile device 10. In another embodiment, the mobile device 10 is provided with a character recognition module such that the user can enter alpha-numeric information into the mobile device 10 by writing that alpha-numeric information on the area 42 with the stylus 36. In that instance, the character recognition module in the mobile device 10 recognizes the alpha-numeric characters and converts the characters into computer recognizable alpha-numeric characters which can be used by the application programs 16 in the mobile device 10.

Figure 5:
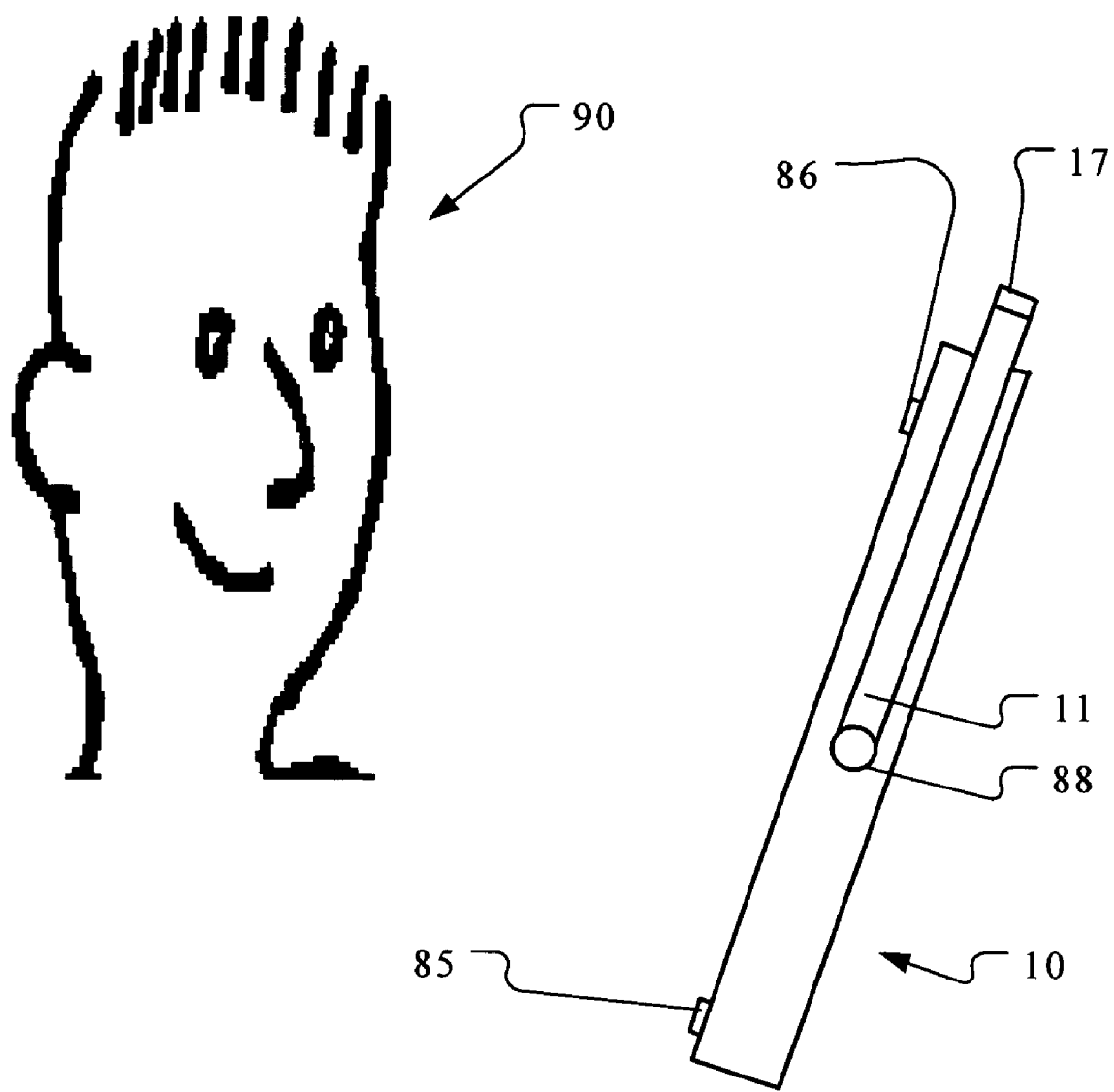
FIGS. 5 and 6 are simplified pictorial illustrations of features of some embodiments of the mobile device of the present invention.
Figure 6:
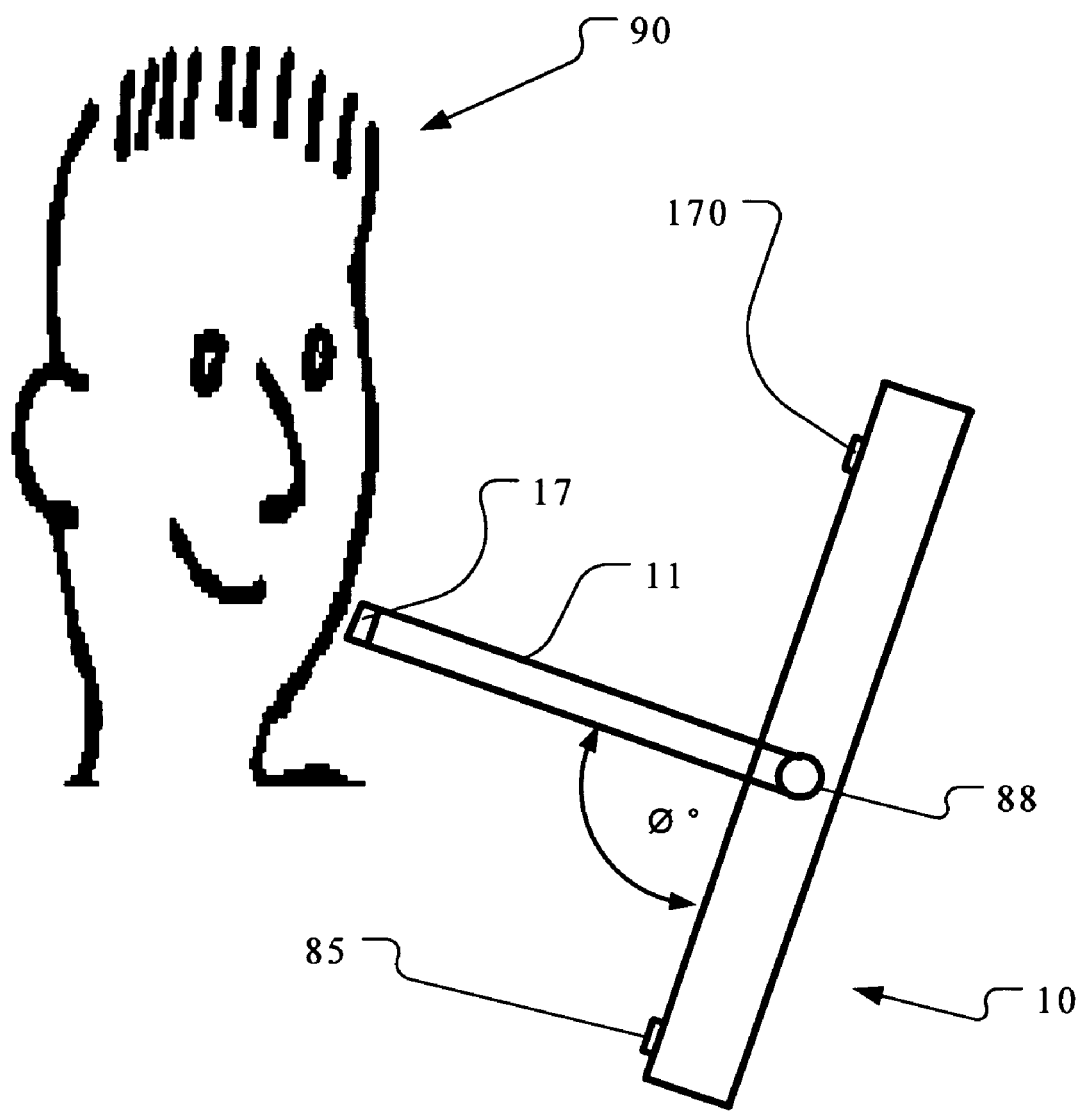

FIGS. 5 and 6 are simplified pictorial illustrations of an aspect of some embodiments of the present invention. As shown in FIGS. 5 and 6, mobile device 10 includes microphone 17 mounted on antenna 11. As illustrated, mobile device 10 also optionally includes second microphone 85 and speaker 86. With mobile device 10 held in front of user 90, antenna 11 can be rotated about pivot 88 such that microphone 17 is positioned closer to the mouth of the user. In some embodiments of the invention, antenna 11 can be rotated such that, for an optimum viewing angle and separation distance of device 10 relative to user 90, antenna 11 forms an angle ø relative to a surface of device 10 which results in the distance between the mouth of user 90 and microphone 17 being minimized. As discussed above, minimization of this distance, for a particular viewing angle and separation distance of mobile device 10 from the user, increases the signal-to-noise ratio of the speech signals provided by the microphone. This is beneficial in embodiments where mobile device 10 serves as a mobile telephone, and in embodiments where mobile device 10 performs speech recognition functions on the speech signals.

Figure 7:
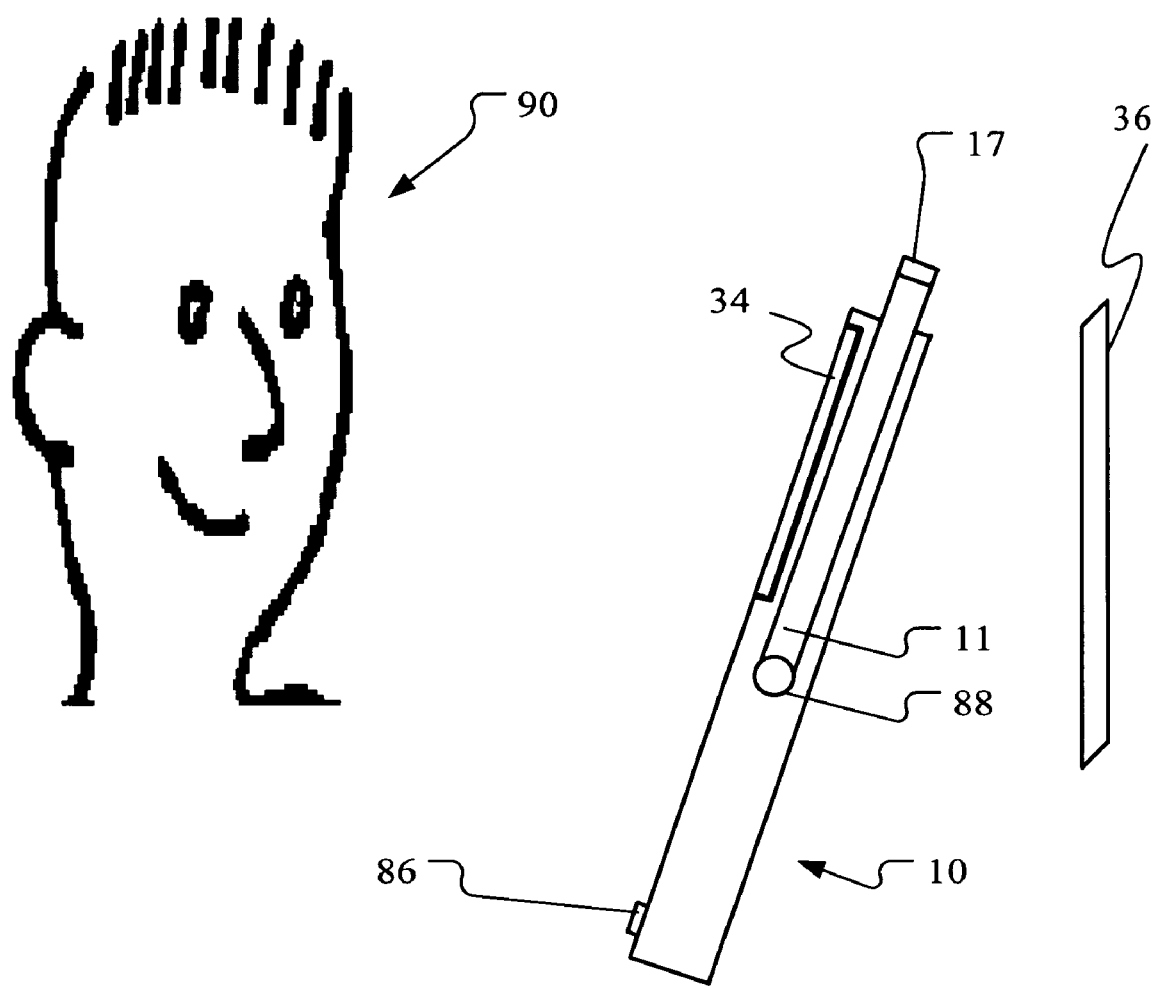
FIGS. 7 and 8 are simplified pictorial illustrations of features of other embodiments of the mobile device of the present invention in which the mobile device functions as a more conventional wireless telephone in one mode of operation.
Figure 8:
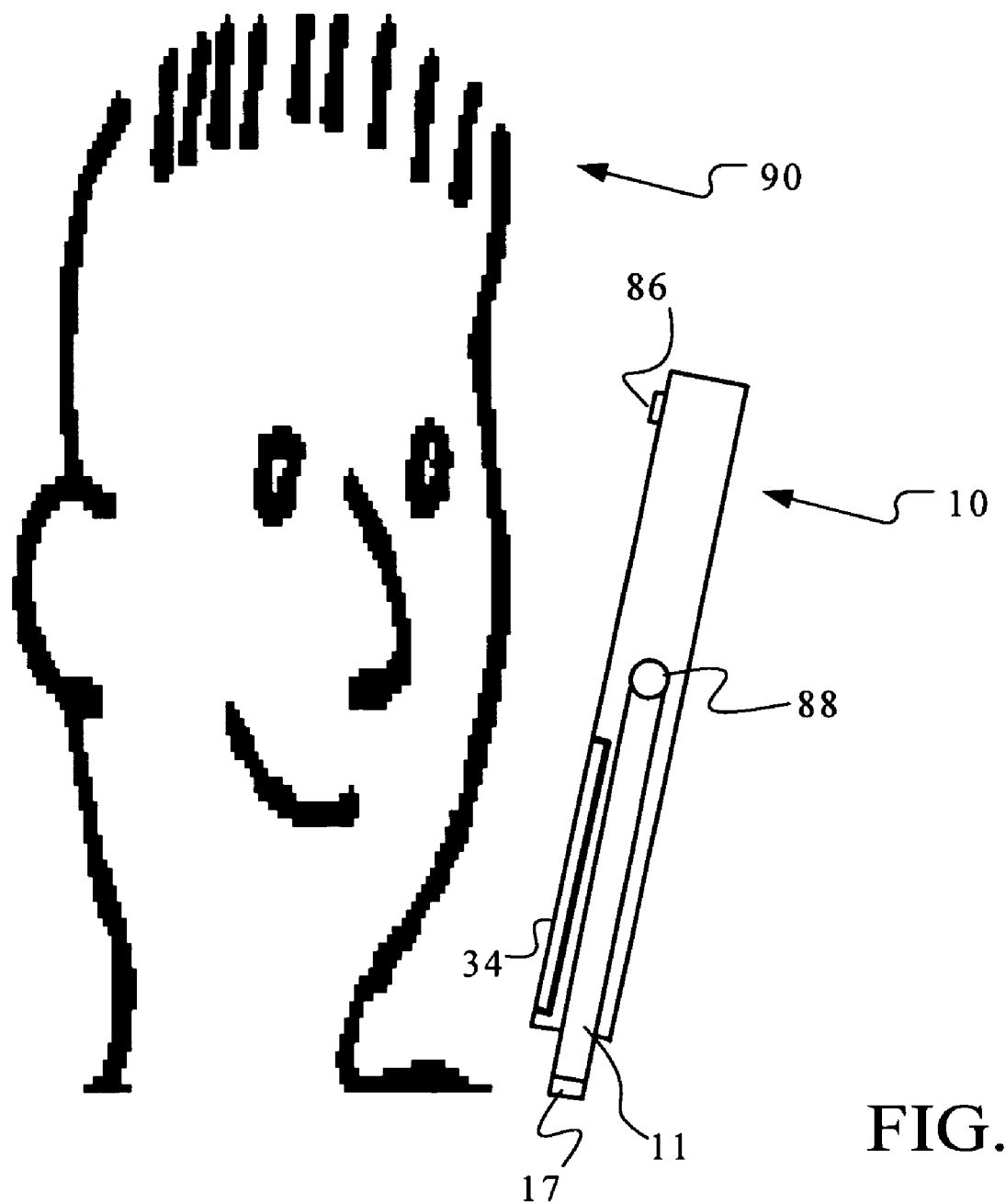

FIGS. 7 and 8 are simplified pictorial illustrations of another aspect of some embodiments of the present invention. As shown in FIGS. 7 and 8, mobile device or PDA 10 can be configured to operate as a "tap and talk" device in one mode of operation, and to operate like a conventional cordless telephone in another mode of operation. As illustrated in FIG. 7, mobile device 10 can include touch sensitive display 34 and stylus 36. Stylus 36 can be used to touch areas of display 34, for example to execute program instructions, to input data, and to dial a telephone number. Antenna 11 can be rotated, as described above, to reduce the distance between microphone 11 and the mouth of user 90 when mobile device 10 is held in the user's hand in the "tap and talk" mode of operation. In this mode of operation, user 90 can view display 34 while talking.

The embodiment of mobile device 10 illustrated in FIGS. 7 and 8 differs from the embodiment shown in FIGS. 5 and 6 in that speaker 86 is positioned at the opposite end of the device. Thus, when mobile device 10 is to be used in a more conventional cordless telephone mode of operation in which display 34 is not viewable during use, device 10 can be turned upside-down. This mode of operation is illustrated in FIG. 8. With device 10 positioned upside down, microphone 17 can be positioned very close to the mouth of the user with little or no rotation of antenna 11. At the same time, speaker 86 can be positioned against the ear of the user. Of course, in this configuration, antenna 11 faces downward instead of upward as in conventional wireless telephones.

Figure 9:
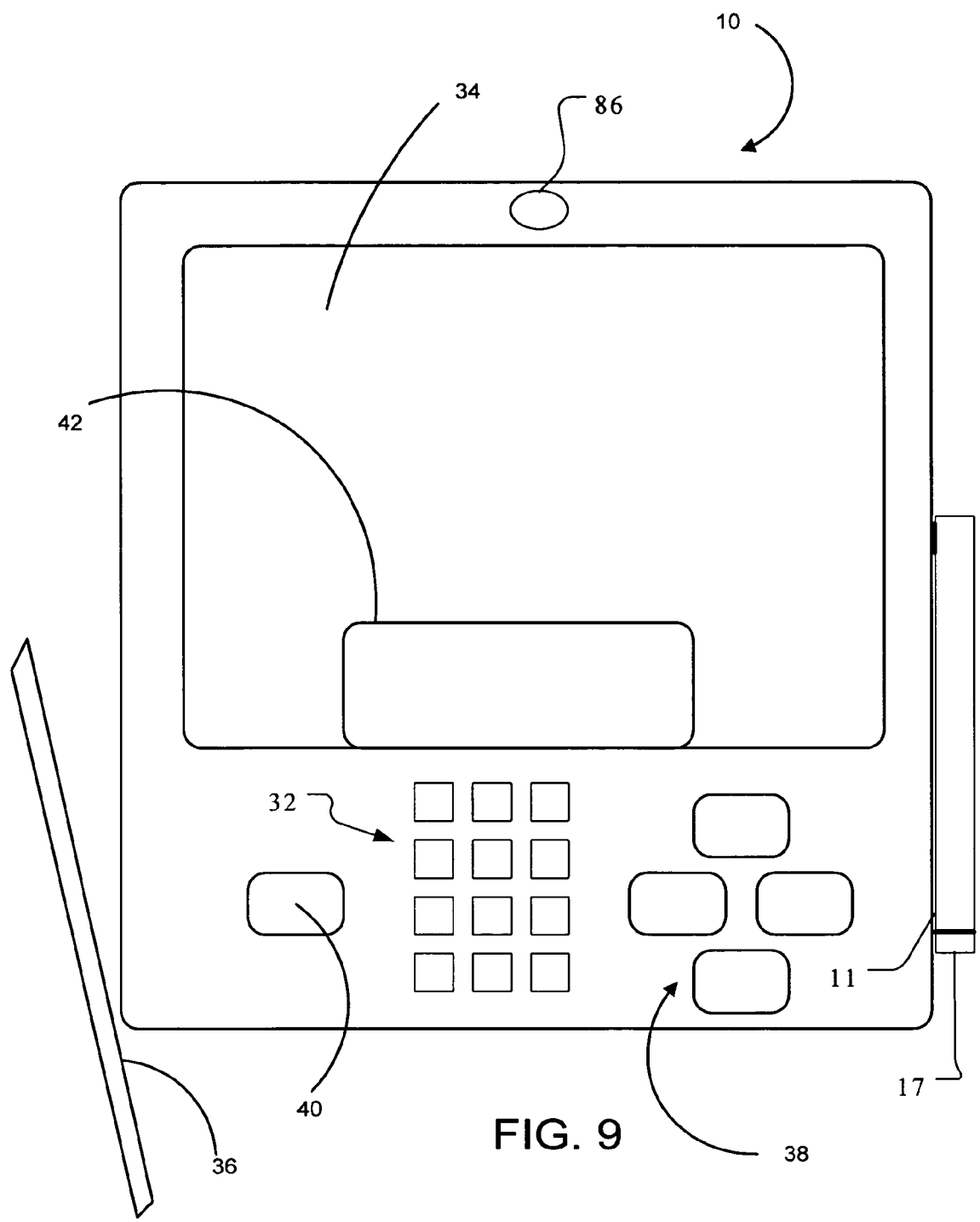
FIG. 9 is a simplified pictorial illustration of another embodiment of the mobile device in accordance with the present invention in which the mobile device can be used as a palm held personal computer and as a wireless telephone.

FIG. 9 is a simplified pictorial illustration of the mobile device 10 in accordance with another embodiment of the present invention. The mobile device 10 as illustrated in FIG. 9 is similar to the embodiment of the mobile device illustrated in FIG. 4. In addition to other common components with the mobile device illustrated in FIG. 4, in the embodiment illustrated in FIG. 9, mobile device 10 includes microphone 17 positioned on antenna 11 and speaker 86 positioned on the housing of the device. However, as shown in FIG. 9, antenna 11 and microphone 17 are positioned at the low end of the device. This reduces the distance between microphone 17 and the mouth of the user when device 10 is used as a palm held personal computer. With the antenna and microphone in this position, and with speaker 86 positioned at the top of the device, device 10 can be used as a wireless telephone by placing the device in a position with speaker 86 adjacent the ear of the user and with microphone 17 adjacent the mouth of the user.

Figure 10:
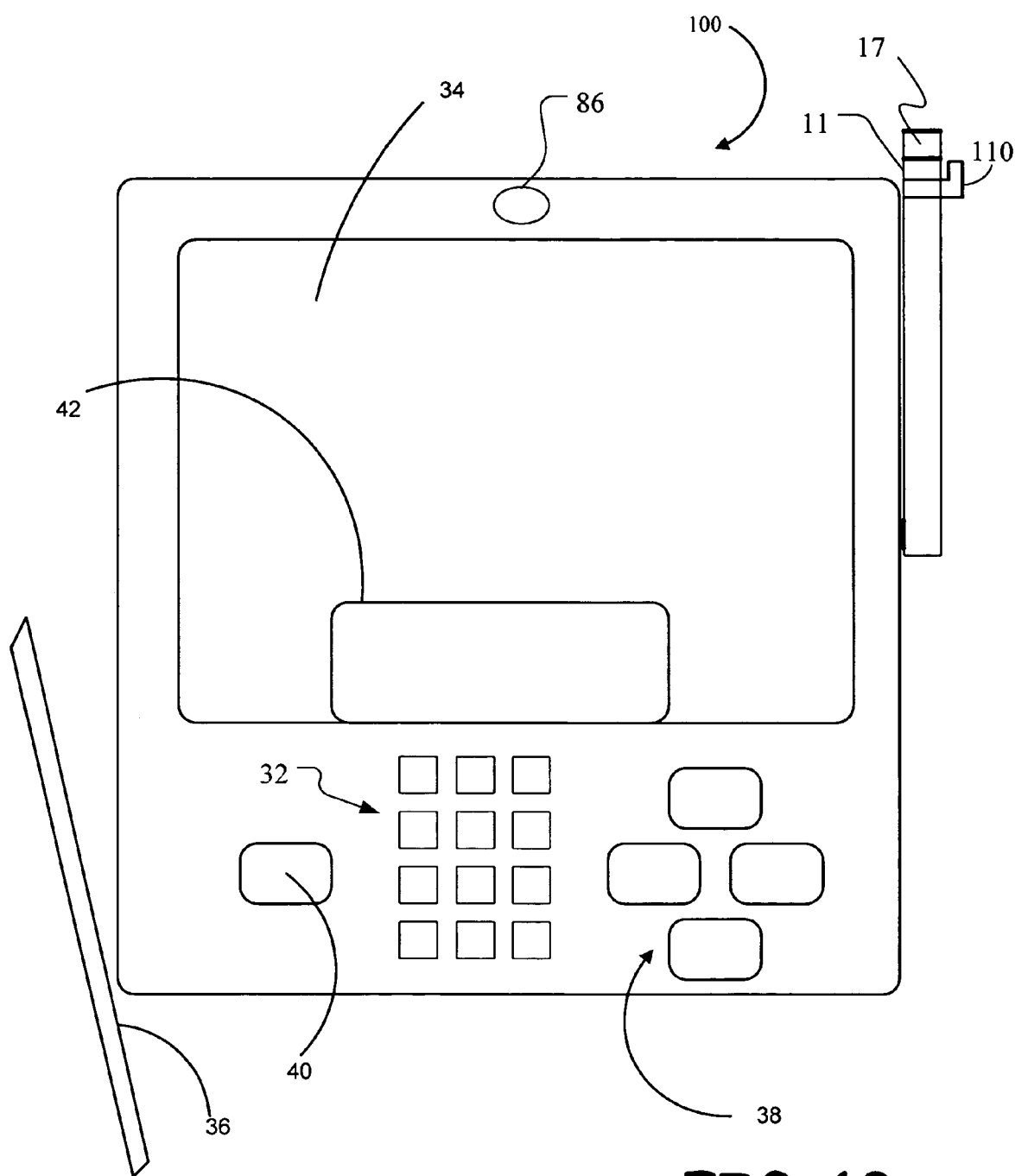
FIG. 10 is a simplified pictorial illustration of another embodiment of the mobile device in accordance with the present invention in which the mobile device includes a speech sensor positioned on the antenna.

FIG. 10 is simplified pictorial illustration of a mobile device 100 in accordance with other embodiments of the present invention. Mobile device 100 is substantially the same as mobile device 10, with the exception that it includes a speech sensor 110 positioned on antenna 11. When antenna 11 is rotated toward the mouth of a user in order to minimize the distance between microphone 17 and the desired source of sound, speech sensor 110 will be positioned in a manner which allows the determination of whether user 90 is speaking. As will be described below in greater detail, this in turn allows speech recognition functions to be suspended when user 90 is not speaking, thereby reducing the effects of background speakers and other noise on the speech recognition process for the speaker of interest.

Figure 11:
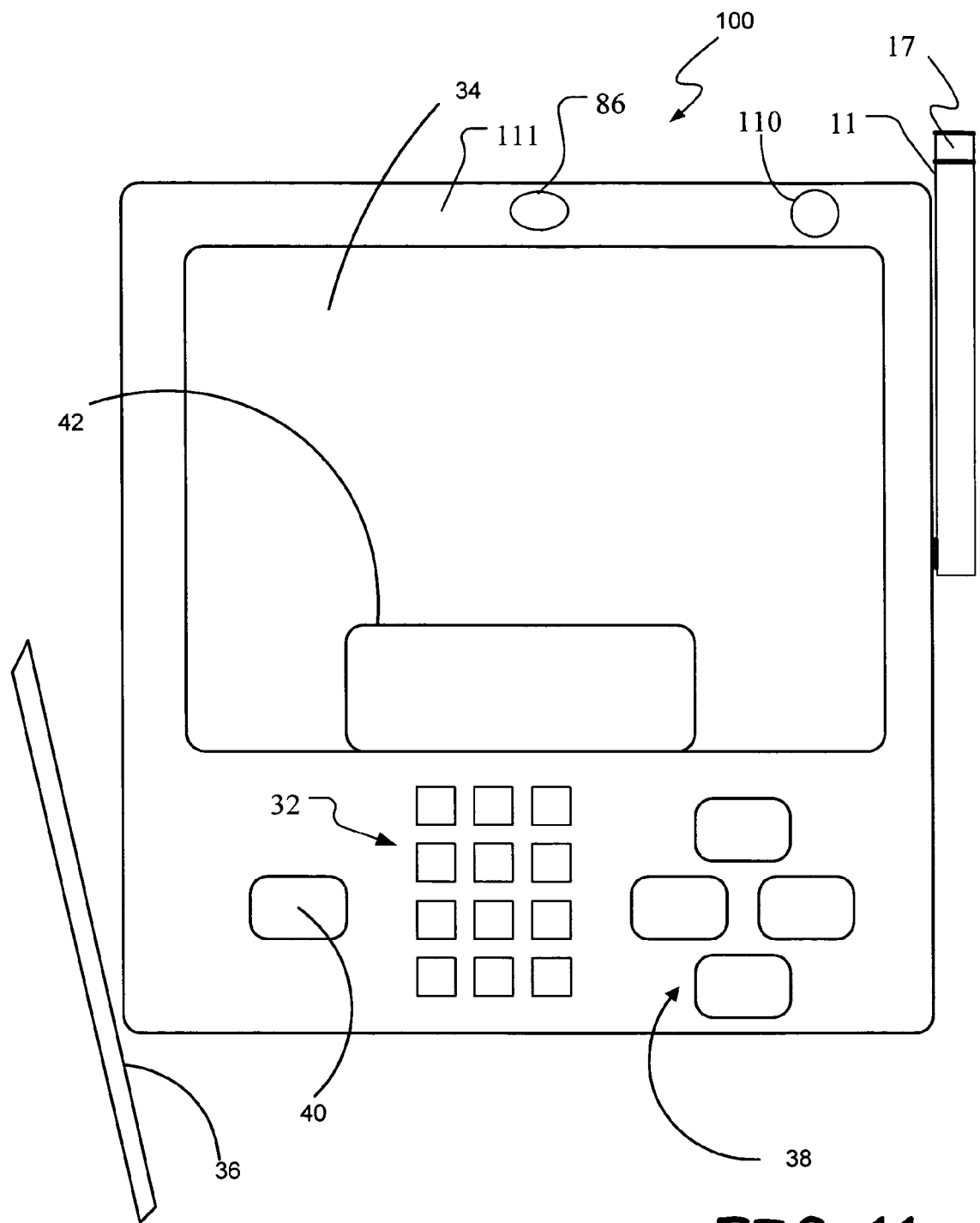
FIG. 11 is a simplified pictorial illustration of another embodiment of the mobile device in accordance with the present invention in which the mobile device includes a speech sensor positioned on a housing.

FIG. 11 is a simplified pictorial illustration of another embodiment of mobile device 100 of the present invention. As illustrated in FIG. 11, in this embodiment, speech sensor 110 is positioned elsewhere on the mobile device, for example on housing 111. Generally, speech sensor 110 can be positioned anywhere which facilitates the detection of speech by the user for purposes of suspending or enabling speech recognition functions. Further discussions of these embodiments are provided with reference to FIGS. 12–17.

Figure 12:
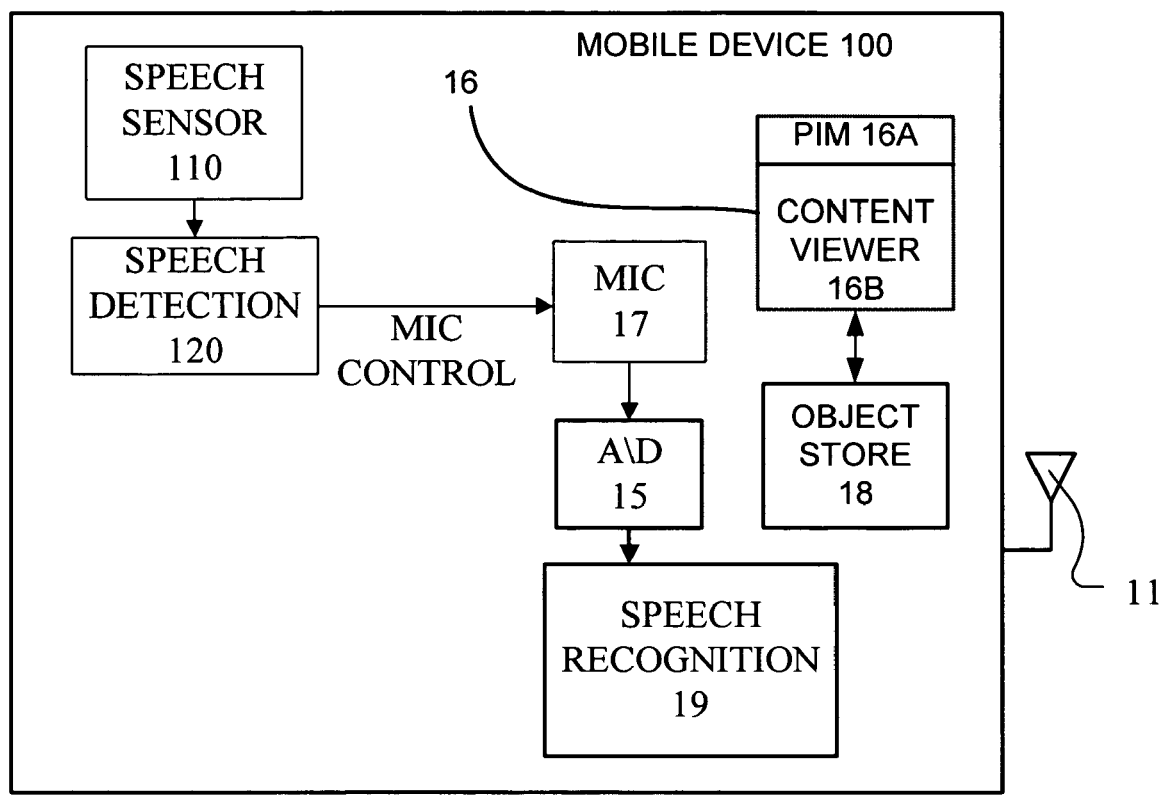
FIG. 12 is a simplified block diagram illustrating an embodiment of a mobile device in accordance with the present invention having a speech sensor and a speech detection component.

FIG. 12 is a block diagram illustrating one embodiment of mobile device 100 in accordance with the present invention. The block diagram of mobile device 100 is similar to the block diagram of mobile device 10 shown in FIG. 1, with the exception of the inclusion of speech sensor or transducer 110 and speech detection module 120. Speech sensor 110 can be any of a variety of sensors, transducers or other devices which provides an output indicative of whether a user is speaking. The signal generated from this sensor can be generated from a wide variety of differing transducer types.

For example, in one embodiment, the transducer is an infrared sensor that is generally aimed at the user's face, notably to the mouth region, and generates a signal indicative of a change in facial movement of the user that corresponds to speech. In another embodiment, the sensor includes a plurality of infrared emitters and sensors aimed at different portions of the user's face.

In still other embodiments, the speech sensor 110 can include a temperature sensor, such as a thermistor, placed in the breath stream of the user, for example by inclusion of speech sensor 110 on antenna 11 near microphone 17 as shown in FIG. 10. As the user speaks, the exhaled breath causes a change in temperature in the sensor and thus detecting speech. This can be enhanced by passing a small steady state current through the thermistor, heating it slightly above ambient temperature. The breath stream would then tend to cool the thermistor which can be sensed by a change in voltage across the thermistor. In any case, speech sensor 110 is illustratively highly insensitive to background speech, but strongly indicative of whether the user is speaking. Other types of speech sensors, such as throat microphones, bone vibration sensitive microphones, etc., can also be used.

In the embodiment illustrated in FIG. 12, speech sensor 110 provides an output indicative of whether the user of mobile device 100 is speaking. Speech detection module 120, which like speech recognition program or module 19 can be executed on processor 20 as shown in FIG. 2, receives the output of speech sensor 110 and determines whether the user of mobile device 100 is speaking. In this embodiment, if it is determined that the user of mobile device 100 is speaking, speech detection module 120 generates a microphone control signal to enable microphone 17. Thus, when the user of mobile device 100 is speaking, the speech will be provided to speech recognition module 19 via microphone 17 and A/D converter 15. When speech detection module 120 determines that the user of mobile device 100 is not speaking, the microphone control signal disables the microphone 17, thus preventing sound data from noise or background speakers from being processed by speech recognition module 19.

Figure 13:
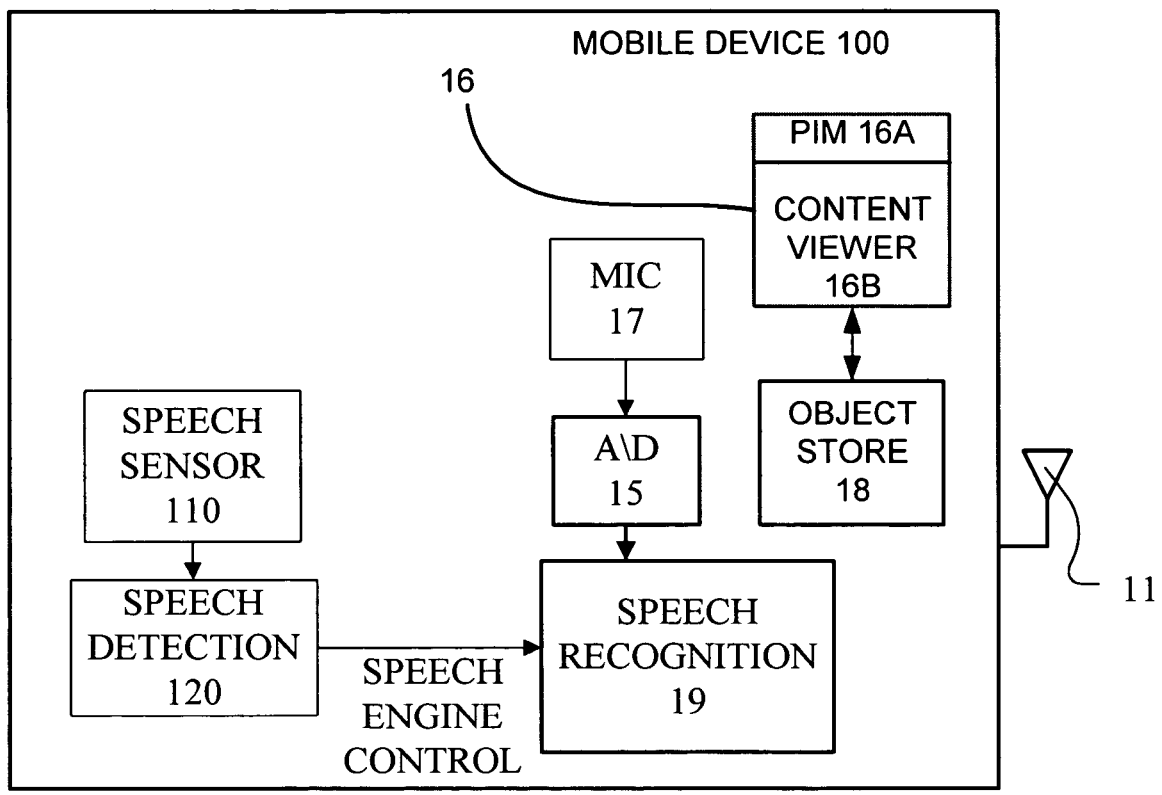
FIG. 13 is a simplified block diagram illustrating another embodiment of a mobile device in accordance with the present invention having a speech sensor and a speech detection component.

FIG. 13 is a block diagram of another exemplary embodiment of mobile device 10 in accordance with the present invention. Mobile device 100 illustrated in FIG. 13 is the same as mobile device 100 illustrated in FIG. 12, with the exception of speech detection module 120 providing a control signal to microphone 17. Instead, in the mobile device illustrated in FIG. 13, speech detection module 120 provides a speech engine control signal to speech recognition module 19. If speech detection module 120 determines that the user of mobile device 100 is speaking, the speech engine control signal enables speech recognition module 19 to perform speech recognition functions. However, if speech detection module 120 determines that the user of mobile device 100 is not speaking, the speech engine control signal disables speech recognition module 19, thus preventing speech recognition functions from being performed on background noise and speakers.

Figure 14:
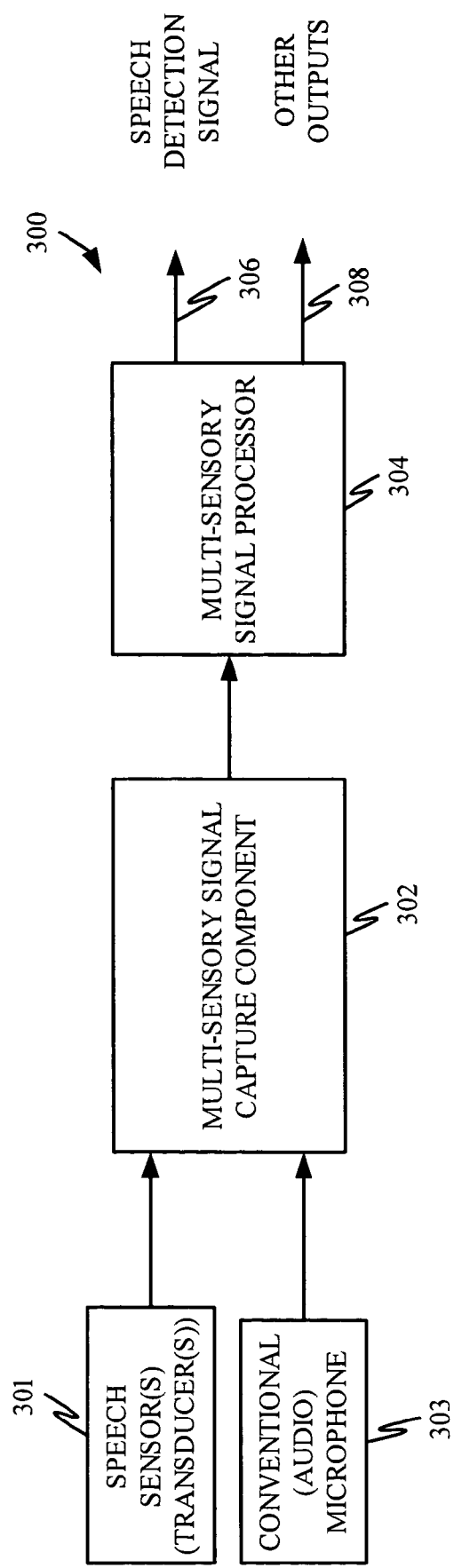
FIG. 14 is a block diagram of a speech detection system in accordance with one embodiment of the present invention.
Figure 15:
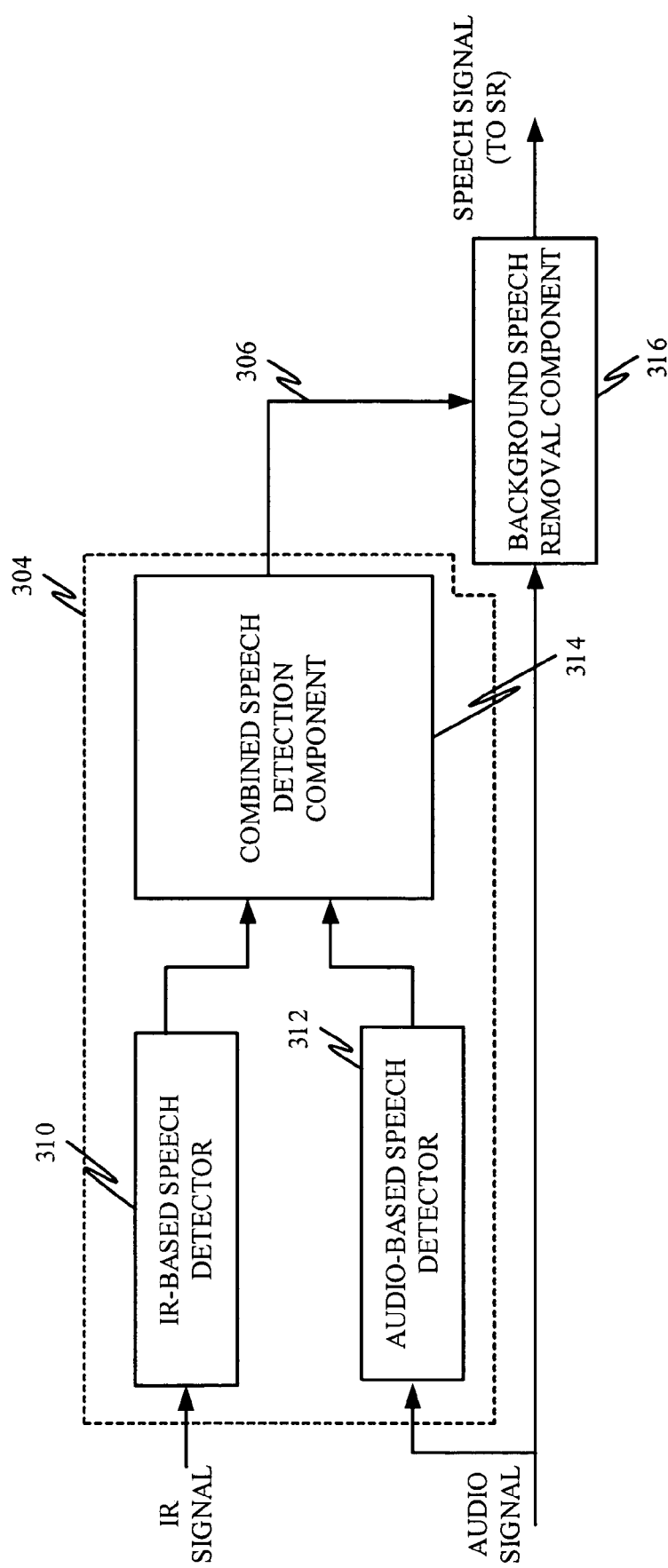
FIGS. 15 and 16 illustrate two different embodiments of a portion of the system shown in FIG. 14.
Figure 16:
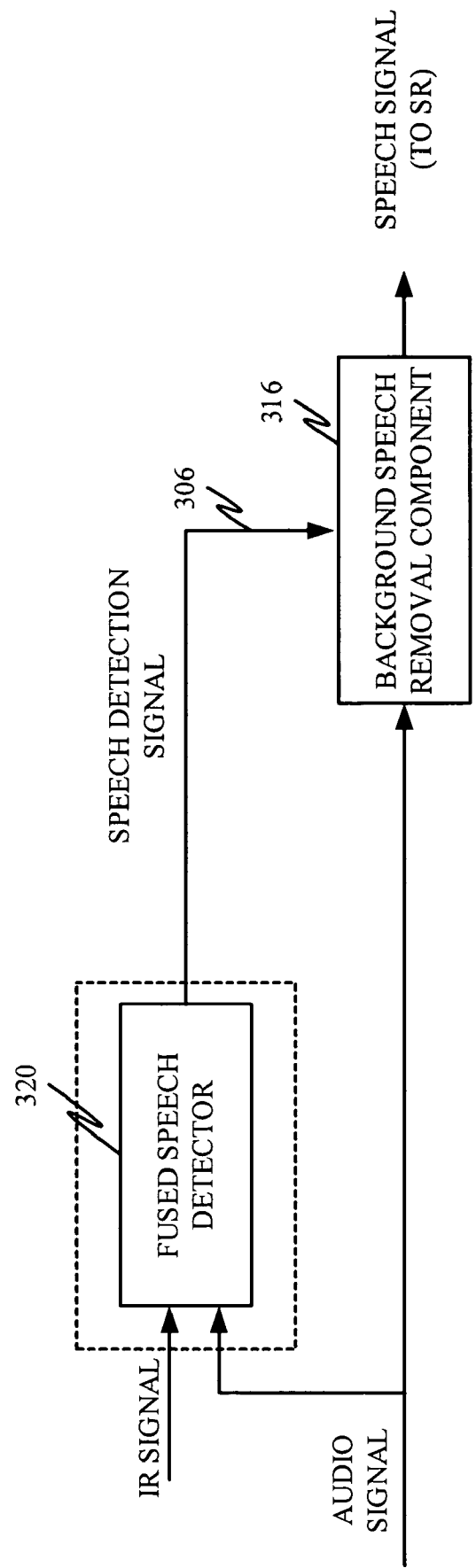

The mobile device block diagrams illustrated in FIGS. 12 and 13 represent examples of implementation embodiments of the present invention. Many other embodiments, employing other speech detection configurations, can also be used. Referring now to FIGS. 14–16, shown are block diagrams of alternate speech detection systems which can be used in accordance with other embodiments of the mobile device of the present invention.

FIG. 14 illustrates a speech detection system 300 which can be used in mobile device embodiments of the present invention. Speech detection system 300 includes speech sensor or transducer 301 (for example speech sensor 110), conventional audio microphone 303 (for example microphone 17), multi-sensory signal capture component 302 and multi-sensory signal processor 304 which can be implemented in processor 20 or in separate processing circuitry.

Capture component 302 captures signals from conventional microphone 303 in the form of an audio signal. Component 302 also captures an input signal from speech transducer 301 which is indicative of whether a user is speaking. The signal generated from this transducer can be generated from a wide variety of other transducers. For example, in one embodiment, the transducer is an infrared sensor that is generally aimed at the user's face, notably the mouth region, and generates a signal indicative of a change in facial movement of the user that corresponds to speech. In another embodiment, the sensor includes a plurality of infrared emitters and sensors aimed at different portions of the user's face. In still other embodiments, the speech sensor or sensors 301 can include a throat microphone which measures the impedance across the user's throat or throat vibration. In still other embodiments, the sensor is a bone vibration sensitive microphone which is located adjacent a facial or skull bone of the user (such as the jaw bone) and senses vibrations that correspond to speech generated by the user. This type of sensor can also be placed in contact with the throat, or adjacent to, or within, the user's ear. In another embodiment, a temperature sensor such as a thermistor is placed in the breath stream such as on the same support that holds the regular microphone. As the user speaks, the exhaled breath causes a change in temperature in the sensor and thus detecting speech. This can be enhanced by passing a small steady state current through the thermistor, heating it slightly above ambient temperature. The breath stream would then tend to cool the thermistor which can be sensed by a change in voltage across the thermistor. In any case, the transducer 301 is illustratively highly insensitive to background speech but strongly indicative of whether the user is speaking.

In one embodiment, component 302 captures the signals from the transducers 301 and the microphone 303 and converts them into digital form, as a synchronized time series of signal samples. Component 302 then provides one or more outputs to multi-sensory signal processor 304. Processor 304 processes the input signals captured by component 302 and provides, at its output, speech detection signal 306 which is indicative of whether the user is speaking. Processor 304 can also optionally output additional signals 308, such as an audio output signal, or such as speech detection signals that indicate a likelihood or probability that the user is speaking based on signals from a variety of different transducers. Other outputs 308 will illustratively vary based on the task to be performed. However, in one embodiment, outputs 308 include an enhanced audio signal that is used in a speech recognition system (such as speech recognition module 19).

FIG. 15 illustrates one embodiment of multi-sensory signal processor 304 in greater detail. In the embodiment shown in FIG. 15, processor 304 will be described with reference to the transducer input from transducer 301 being an infrared signal generated from an infrared sensor located proximate the user's face. It will be appreciated, of course, that the description of FIG. 15 could just as easily be with respect to the transducer signal being from a throat sensor, a vibration sensor, etc.

In any case, FIG. 15 shows that processor 304 includes infrared (IR)-based speech detector 310, audio-based speech detector 312, and combined speech detection component 314. IR-based speech detector 310 receives the IR signal emitted by an IR emitter and reflected off the speaker and detects whether the user is speaking based on the IR signal. Audio-based speech detector 312 receives the audio signal and detects whether the user is speaking based on the audio signal. The output from detectors 310 and 312 are provided to combined speech detection component 314. Component 314 receives the signals and makes an overall estimation as to whether the user is speaking based on the two input signals. The output from component 314 comprises the speech detection signal 306. In one embodiment, speech detection signal 306 is provided to background speech removal component 316. Speech detection signal 306 is used to indicate when, in the audio signal, the user is actually speaking.

More specifically, the two independent detectors 310 and 312, in one embodiment, each generate a probabilistic description of how likely it is that the user is talking. In one embodiment, the output of IR-based speech detector 310 is a probability that the user is speaking, based on the IR-input signal. Similarly, the output signal from audio-based speech detector 312 is a probability that the user is speaking based on the audio input signal. These two signals are then considered in component 314 to make, in one example, a binary decision as to whether the user is speaking.

Signal 306 can be used to further process the audio signal in component 316 to remove background speech. In one embodiment, signal 306 is simply used to provide the speech signal to the speech recognition engine through component 316 when speech detection signal 306 indicates that the user is speaking. If speech detection signal 306 indicates that the user is not speaking, then the speech signal is not provided through component 316 to the speech recognition engine.

In another embodiment, component 314 provides speech detection signal 306 as a probability measure indicative of a probability that the user is speaking. In that embodiment, the audio signal is multiplied in component 316 by the probability embodied in speech detection signal 306. Therefore, when the probability that the user is speaking is high, the speech signal provided to the speech recognition engine through component 316 also has a large magnitude. However, when the probability that the user is speaking is low, the speech signal provided to the speech recognition engine through component 316 has a very low magnitude. Of course, in another embodiment, the speech detection signal 306 can simply be provided directly to the speech recognition engine which, itself, can determine whether the user is speaking and how to process the speech signal based on that determination.

FIG. 16 illustrates another embodiment of multi-sensory signal processor 304 in more detail. Instead of having multiple detectors for detecting whether a user is speaking, the embodiment shown in FIG. 16 illustrates that processor 304 is formed of a single fused speech detector 320. Detector 320 receives both the IR signal and the audio signal and makes a determination, based on both signals, whether the user is speaking. In that embodiment, features are first extracted independently from the infrared and audio signals, and those features are fed into the detector 320. Based on the features received, detector 320 detects whether the user is speaking and outputs speech detection signal 306, accordingly.

Regardless of which type of system is used (the system shown in FIG. 15 or that shown in FIG. 16) the speech detectors can be generated and trained using training data in which a noisy audio signal is provided, along with the IR signal, and also along with a manual indication (such as a push-to-talk signal) that indicates specifically whether the user is speaking.

Figure 17:
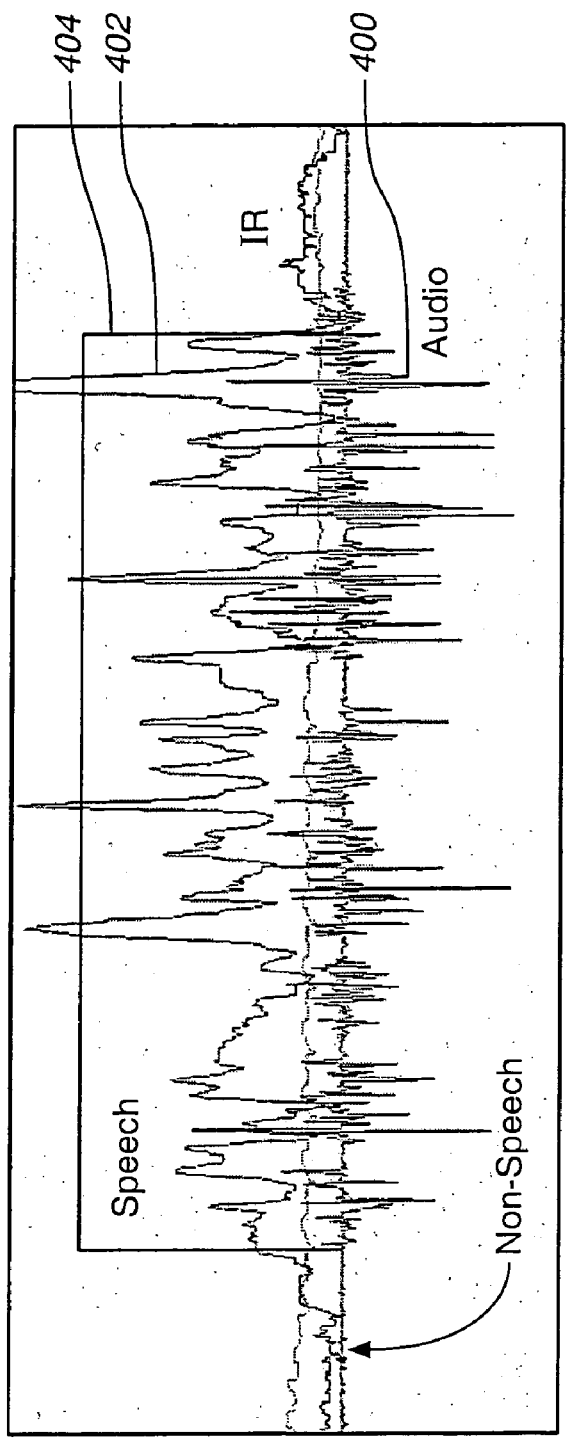
FIG. 17 is a plot of signal magnitude versus time for a microphone signal and an infrared sensor signal.

To better describe this, FIG. 17 shows a plot of an audio signal 400 and an infrared signal 402, in terms of magnitude versus time. FIG. 17 also shows speech detection signal 404 that indicates when the user is speaking. When in a logical high state, signal 404 is indicative of a decision by the speech detector that the speaker is speaking. When in a logical low state, signal 404 indicates that the user is not speaking. In order to determine whether a user is speaking and generate signal 404, based on signals 400 and 402, the mean and variance of the signals 400 and 402 are computed periodically, such as every 100 milliseconds. The mean and variance computations are used as baseline mean and variance values against which speech detection decisions are made. It can be seen that both the audio signal 400 and infrared signal 402 have a larger variance when the user is speaking, than when the user is not speaking. Therefore, when observations are processed, such as every 5–10 milliseconds, the mean and variance (or just the variance) of the signal during the observation is compared to the baseline mean and variance (or just the baseline variance). If the observed values are larger than the baseline values, then it is determined that the user is speaking. If not, then it is determined that the user is not speaking. In one illustrative embodiment, the speech detection determination is made based on whether the observed values exceed the baseline values by a predetermined threshold. For example, during each observation, if the infrared signal is not within three standard deviations of the baseline mean, it is considered that the user is speaking. The same can be used for the audio signal.

In accordance with another embodiment of the present invention, the detectors 310, 312, 314 or 320 can also adapt during use, such as to accommodate for changes in ambient light conditions, or such as for changes in the head position of the user, which may cause slight changes in lighting that affect the IR signal. The baseline mean and variance values can be re-estimated every 5–10 seconds, for example, or using another revolving time window. This allows those values to be updated to reflect changes over time. Also, before the baseline mean and variance are updated using the moving window, it can first be determined whether the input signals correspond to the user speaking or not speaking. The mean and variance can be recalculated using only portions of the signal that correspond to the user not speaking In addition, from FIG. 17, it can be seen that the IR signal may generally precede the audio signal. This is because the user may, in general, change mouth or face positions prior to producing any sound. Therefore, this allows the system to detect speech even before the speech signal is available.

Although the present invention has been described with reference to various embodiments, workers skilled in the art will recognize that changes may be made in form and detail without departing from the spirit and scope of the invention.

What is claimed is:

1. A mobile computing device comprising:
an antenna adapted to be oriented toward a user;
a first microphone positioned on the antenna and adapted to convert audible speech from the user into speech signals;
a speech sensor outputting a sensor signal indicative of whether the user is speaking based on a non-audio input generated by speech action of the user;
a speech detector component outputting a speech detection signal indicative of whether the user is speaking based on the sensor signal;
a speech recognition component coupled to the first microphone and adapted to perform speech recognition algorithms on the speech signals to generate speech recognition data; and
an analog-to-digital converter coupling the first microphone to the speech recognition component and digitizing the speech signals, the analog-to-digital converter providing the digitized speech signals to the speech recognition component, and the speech recognition component performing the speech recognition algorithms on the digitized speech signals to generate the speech recognition data.

2. The mobile computing device of claim 1, wherein the speech recognition component is enabled or disabled as a function of the speech detection signal.

3. A mobile computing device comprising:
an antenna adapted to be oriented toward a user;
a first microphone positioned on the antenna and adapted to convert audible speech from the user into speech signals;
a speech sensor outputting a sensor signal indicative of whether the user is speaking based on a non-audio input generated by speech action of the user; and
a speech detector component outputting a speech detection signal indicative of whether the user is speaking based on the sensor signal, wherein the speech detector component outputs the speech detection signal based on a first characteristic of the sensor signal and based on the speech signals from the first microphone, wherein the first characteristic of the sensor signal has a first level when the user is speaking and a second level when the user is not speaking and wherein the speech detector component outputs the speech detection signal based on a level of the first characteristic of the sensor sienal relative to a baseline level of the first characteristic that comprises a predetermined one of the first and second levels of the first characteristic.

4. The mobile computing device of claim 3, wherein the baseline level is calculated based on a level of the first characteristic over a time period.

5. The mobile computing device of claim 4, wherein the baseline level is calculated, by averaging the level of the first characteristic over the time period.

6. The mobile computing device of claim 4, wherein the baseline level is recalculated intermittently during operation of the speech detection system.

7. The mobile computing device of claim 6, wherein the baseline level is recalculated periodically to represent the level of the first characteristic over a revolving time window.

8. The mobile computing device of claim 6, wherein the speech detection component outputs the speech detection signal based on a comparison of the level of the first characteristic of the sensor signal to the baseline level, and wherein the comparison is performed periodically.

9. A method of performing speech recognition, the method comprising:
providing a mobile computing device;
rotating an antenna of the mobile computing device toward the user such that a first microphone positioned at a distal end of the antenna is directed toward a mouth of the user;
converting audible speech from the user into speech signals using the first microphone positioned at the distal end of the antenna;
digitizing the speech signals;
providing a sensor signal based on a non-audio input generated by speech action of the user and indicative of whether the user is speaking; and
performing speech recognition algorithms on the digitized speech signals using a microprocessor positioned within the mobile computing device to generate speech recognition data if the sensor signal is indicative of the user speaking.

10. The method of claim 9, wherein the step of rotating the antenna toward the user further comprises rotating the antenna from a first position to a second position which minimizes a distance between the first microphone and the mouth of the user for a particular separation distance of the mobile computing device relative to the user.

11. The method of claim 10 wherein the step of rotating the antenna toward the user further comprises rotating the antenna to the second position which minimizes the distance between the first microphone and the mouth of the user for a particular combination of separation distance and viewing angle of the mobile computing device relative to the user.

12. The method of claim 11, and further comprising outputting a speech detection signal indicative of whether the user is speaking based on the sensor signal.

13. The method of claim 9, wherein providing the sensor signal based on the non-audio input generated by speech action of the user and indicative of whether the user is speaking further comprises generating a facial movement sensor output indicative of facial movement of the user.

* * * * *